May 31, 1927.
J. E. RUBY
1,630,969
ANIMAL TRAP
Filed Nov. 6, 1925
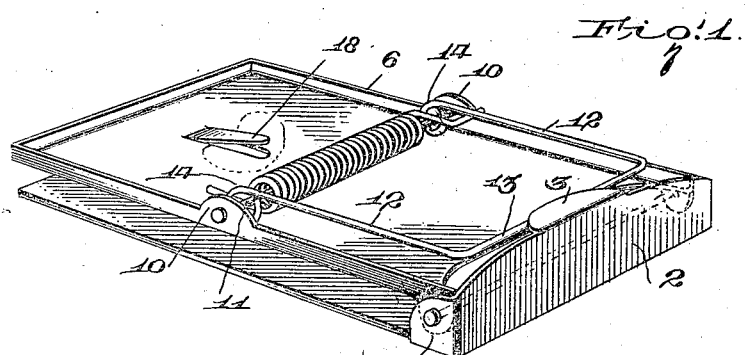
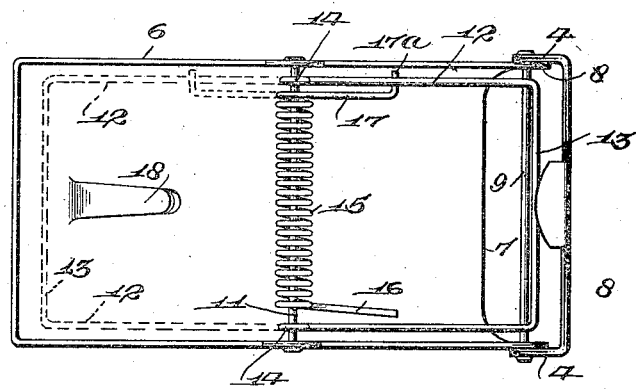
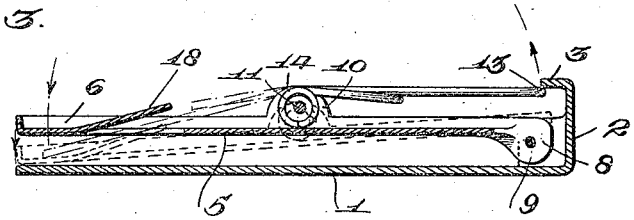
WITNESSES
INVENTOR
J. E. Ruby
BY
ATTORNEYS Patented May 31, 1927.

1,630,969

UNITED STATES PATENT OFFICE.

JAMES EDWARD RUBY, OF WAYNOKA, OKLAHOMA.

ANIMAL TRAP.

Application filed November 6, 1925. Serial No. 67,341.

My invention relates to improvements in animal traps and it consists in the combinations, constructions and arrangements herein described and claimed.

An object of the invention is the provision of a simple, reliable and efficient trap which is particularly well adapted for use in catching small animals, such as mice, rats and the like.

A further object of the invention is the provision of a trap of the character described which can be set quickly, easily and safely but which when set is adapted to be actuated as a result of pressure which has been applied at any point on a swingable trigger plate which is of relatively great area for a trap of a given size.

Other objects and advantages of the invention will be apparent from the following description, considered in conjunction with the accompanying drawings, in which—

Figure 1 is a perspective view of the improved trap, showing the swingable spring pressed jaw in "set" position, Figure 2 is a plan view of the improved trap, showing in full lines the swingable spring pressed jaw in "set" position and showing in dotted lines the released position of the swingable jaw, Figure 3 is a longitudinal vertical section through the improved trap, showing in full lines the trigger plate and the swingable jaw in "set" positions and showing in dotted lines the trigger plate and the swingable jaw after the swingable jaw has been released.

The improved trap comprises a base plate 1 which is shown as being substantially rectangular and as being formed with an upstanding flange 2 at one end thereof. This flange 2 has the upper end portion thereof formed with an inwardly extending substantially horizontal extension 3 which is located intermediate the length of the end flange 2 at the upper edge of the latter. The extension 3 preferably has the free edge thereof convexly curved. This extension 3 constitutes a stop or catch for a purpose to be presently described.

The base plate 1 also is formed with a pair of upstanding lateral ears 4 which may be integral with the flange 2 and are located adjacent to the same end of the base plate 1 as that which is provided with the flange 2.

A trigger plate 5 has a length but slightly less than that of the base plate 1 and preferably is as wide as the base plate 1. This trigger plate is formed with a continuous upstanding marginal bead or flange 6. The trigger plate 5 is formed with a cut away portion 7 at one end which extends nearly the full width of the trigger plate, thus producing a pair of spaced parallel vertical ears 8 which are straddled by the ears 4 of the base plate when the trigger plate is disposed directly above the base plate as best seen in Figure 2. The ears 4 and 8 of the base plate and the trigger plate, respectively, have aligned openings for the reception of a horizontal transverse rod 9, whereby the trigger plate will be swingingly attached to the base plate. The trigger plate will be disposed above the base plate in spaced relation to the latter when both the trigger plate and the base plate are substantially horizontal, as shown in Figure 1 and in full lines in Figure 3.

The side portions of the marginal flange 6 on the trigger plate are enlarged vertically intermediate their length to produce a pair of opposite ears 10 having aligned openings for the reception of a transverse rod 11. A swingable jaw member comprises a pair of arms 12 which are joined at one end by a cross member 13, the member 13 preferably being integral with the arms 12. The extremities of the arms 12 are formed to provide eye members 14 which encircle the rod 11, whereby the swingable jaw member 12—13—12 may swing about the axis of the rod 11 from position to overlie one approximately half portion of the trigger plate as shown in Figure 1 and by the full lines in Figures 2 and 3 to position to overlie the remaining half portion of the trigger plate as shown by the dotted lines in Figures 2 and 3. The jaw member 12—13—12 may be considered as being substantially U-shaped and the cross member 13 may be termed the web portion of said swingable jaw member. A torsion spring 15 encircles the rod 11 and has one end portion thereof bearing against the upper face of the trigger plate 5 at the side of the latter that is nearest to the projection 3 on the base plate, as indicated at 16. The opposite end portion of the torsion spring 15 is indicated at 17 and extends at one side of the rod 11 longitudinally of the trigger plate for a short distance and then is bent laterally as indicated at 17ª. The end portion 17ª engages with one of the arms 12 of the swingable jaw member and bears against the underside of that arm of the swingable jaw member when said swingable jaw member is in position to overlie the portion of the trigger plate that is next to the flange 2, as shown in Figure 1 and by the full lines in Figures 2 and 3. The torsion spring 15 therefore will tend to urge the jaw members 12—13—12 from the position shown in Figure 1 and by the full lines in Figures 2 and 3 to the position shown by the dotted lines in Figures 2 and 3.

The arms 12 of the swingable jaw member are of sufficient length to cause the transverse member 13 of said swingable jaw to be positioned underneath the edge portion of the stop or catch 3 when the jaw member has been swung to the position shown by the full lines in the drawings and the trigger plate 5 has been raised to position to be substantially parallel to the base plate 1 as best seen in Figure 3. The swingable jaw member is prevented by the stop 3 from swinging to the position that is indicated by the dotted lines in Figures 2 and 3 as a result of the actuation of the spring 15 until the free end portion of the trigger plate shall have been depressed sufficiently to permit the web portion of the swingable jaw member to move past the edge of the stop 3. When the free end of the trigger plate has been swung from the full line position of Figure 3 to the dotted line position of the same figure the web of the swingable jaw member will be released from the stop 3 and the jaw member will swing from the full line position of Figure 3 to the dotted line position of the same figure. Any portion of an animal which may extend onto the trigger plate in the path of movement of the swingable jaw member at the time the jaw member is released from the stop 3 will be caught between the descending swinging jaw member and a portion of the rim flange 6 of the trigger plate and will be firmly gripped. It therefore will be obvious that the swingable jaw member may be released as a result of pressure that is applied by any portion of an animal against any part of the trigger plate and that therefore the improved trap will be particularly well adapted for catching animals when the trap is placed in a run-way of such animals. The portion of the trigger plate that is remote from the flange 2 of the base plate has a tongue 18 struck upwardly therefrom, the point of the tongue being turned in the direction of the flange 2 and a suitable bait may be supported on this tongue or between the tongue and the trigger plate. However, as pointed out in the foregoing, it is not necessary that the animal actually touch the bait in order that the spring jaw shall be released although of course the provision of a bait that is held in place by the holder may be desirable for the purpose of enticing animals to approach the trap. When the spring jaw is in the position shown by the full lines in the drawing, the pressure of a finger on the spring jaw will be sufficient to hold the latter against swinging accidentally from "set" position at the time the trap is being placed as desired.

I claim:—

1. A trap comprising a base plate, a trigger plate having a width approximately equal to that of the base plate and being swingingly attached to the base plate at one end of the latter, a spring pressed jaw carried by said trigger plate, and a stop supported on said base plate at said one end of the latter, said stop being adapted to be engaged by said spring pressed jaw when said spring pressed jaw is in "set" position to releasably hold the free end of the trigger plate above the base plate and to releasably hold the spring pressed jaw against swinging from "set" position against the trigger plate.

2. A trap comprising a base plate having an upstanding flange at one end extending the full width of the base plate, a pair of ears extending from the ends of said flange along opposite side edges of the adjacent end of said base plate, a transverse rod extending between said ears above the plane of said base plate, a trigger plate pivotally supported at one end on said rod, said flange having an inwardly extending stop at its upper edge intermediate the length of the flange, and a substantially U-shaped spring pressed jaw having arms pivotally supported at their extremities on said trigger plate intermediate the length of the latter, said jaw having a web portion engageable under said stop when the free end of said trigger plate has been raised above the plane of said base plate and adapted to be disengaged from said stop when the trigger plate is swung from raised position toward said base plate.

3. A trap comprising a base plate having an upstanding flange at one end extending the full width of the base plate, a pair of ears extending from the ends of said flange along opposite side edges of the adjacent end of said base plate, a transverse rod extending between said ears above the plane of said base plate, a trigger plate pivotally supported at one end on said rod, said flange having an inwardly extending stop at its upper edge intermediate the length of the flange, and a substantially U-shaped spring pressed jaw having arms pivotally supported at their extremities on said trigger plate intermediate the length of the latter, said jaw having a web portion engageable under said stop when the free end of said trigger plate has been raised above the plane of said base plate and adapted to be disengaged from said stop when the trigger plate is swung from raised position toward said base plate, said trigger plate having a width approximately equal to that of said base plate and said trigger plate having ears at the sides of the first named end portion of the trigger plate, said last named ears having alined openings through which said rod extends.

JAMES EDWARD RUBY.